United States Patent Office 3,260,736
Patented July 12, 1966

3,260,736
PREPARATION OF THIOLESTERS
James C. Martin and Russell Gilkey, Kingsport, Tenn., assignors to Eastman Kodak Company, Rochester, N.Y., a corporation of New Jersey
No Drawing. Filed Dec. 20, 1960, Ser. No. 76,997
13 Claims. (Cl. 260—455)

This invention relates to a novel process for the preparation of thiolesters. More particularly, it relates to compounds useful as herbicides, plasticizers, oil additives, intermediates in the synthesis of pharmaceutical compounds and the like. The preparation of linear poly(thiol esters) is described and claimed in the applicants' copending application Serial No. 76,993, filed on December 20, 1960.

It is an object of this invention to provide a new method of producing thiolesters. Another object of this invention is to provide an economical method for preparing thiolesters that can be used either on a laboratory or a commercial scale. A further object of this invention is to provide a novel method for the production of thiolester plasticizers.

We have found that phenyl esters of carboxylic acids may be reacted easily with mercaptans to produce thiolesters. According to a preferred embodiment of our invention a phenyl ester or substituted phenyl ester represented by the formula

or

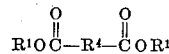

is reacted with a mercaptan represented by the formula HS—R³ or HS—R⁵—SH to give the corresponding thiolester and phenol. The phenol is removed by distillation, leaving the thiolester, which may be further purified, if desired by recrystallization, distillation or other appropriate method. In the preceding formulas R¹ is phenyl or substituted phenyl, R² is an aliphatic or cycloaliphatic radical containing from 1 to 18 carbon atoms or phenyl or substituted phenyl, R³ is an aliphatic radical containing from 8 to 18 carbon atoms or phenol or substituted phenol, R⁴ is an aliphatic or cycloaliphatic radical containing from 0 to 10 carbon atoms or o, m, or p-phenylene, R⁵ is an aliphatic radical containing from 4 to 10 carbon atoms or phenylene or alkylidene diphenyl. We prefer to use a catalyst in our reaction, although the use of a catalyst is not absolutely necessary. Appropriate basic ester interchange catalysts known to the art include lithium hydride, titanium butylate, sodium, sodium hydride, calcium hydride, dibutyl tin oxide, and the like. When a phenyl ester corresponding to the second formula given hereinabove,

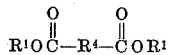

is used in the process of our invention, the amount of mercaptan reacted herewith should be twice the number of moles of said phenyl ester. When the mercaptan used has the second mercaptan formula given hereinabove, HS—R⁵—SH, twice the number of moles of phenyl ester as the number of moles of mercaptan should be used.

The following equations are illustrative of the reactions involved in the process of this invention.

(1) 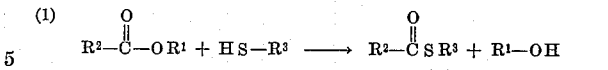

(2) 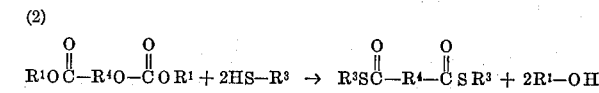

(3) 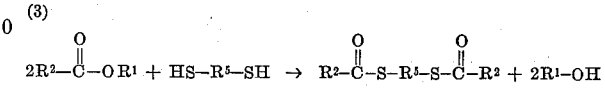

In the above equations the radicals are the same as those defined hereinabove.

Suitable esters for use in the process of our invention are phenyl acetate, p-tolyl acetate, p-nitrophenyl acetate, m-nitrophenyl propionate, 2,6-dichlorophenyl butyrate, phenyl isobutyrate, phenyl stearate, phenyl oleate, p-chlorophenyl dodecanoate, phenyl 2-ethyl hexanoate, phenyl pivalate, phenyl benzoate, phenyl toluate, phenyl p-nitrobenzoate, phenyl picrate, cyclohexane carboxylic acid, phenyl ester, cyclohexane carboxylic acid, p-nitrophenyl ester, bicyclo(2-2-1)hept-5-ene carboxylic acid, phenyl ester, diphenyl malonate, diphenyl adipate, di(p-chlorophenyl) sebacate, diphenyl azelate, trans-1,4-cyclohexane dicarboxylic acid, diphenyl ester, diphenyl terephthalate, diphenyl isophthalate, diphenyl phthalate, and the like.

Representative of mercaptans which may be used in the process of this invention are octanethiol, decanethiol, dodecanethiol, benzyl mercaptan, benzenethiol, p-tolylthiol, p-tert-butylbenzenethiol, m-tolylthiol, 1,4-butanedithiol, 1,6-hexanedithiol, 1,8-octanedithiol, 1,10-decanedithiol, 1,4 - benzenedithiol, p - isopropylidenedi(benzenethiol), p-methylenedi(benzenethiol).

The process of our invention may be carried out at atmospheric pressure or under vacuum. When operated at atmospheric pressure the preferred temperature range is from about 190 to 320° C. It is also possible to start our process at atmospheric pressure and finish it under vacuum. The temperature and pressure limitations are actually limited only by the requirement that the phenol formed in the reaction of the phenyl ester with the mercaptan be distilled from the reaction products.

A further understanding of our invention may be had from a consideration of the following examples, which, with the exception of the first three, which illustrate that *alkyl* esters of carboxylic acids cannot be used to produce thiolesters in accordance with the process of this invention, illustrate certain of our preferred embodiments.

*Example I*

A mixture of 91.0 g. (0.45 mole) of dodecanethiol, 46.0 g. (0.45 mole) of methyl isobutyrate and 0.02 g. of lithium hydride was refluxed using a 10-in. packed column. No methanol was separated; the head temperature remained at about 90° C. (the approximate boiling point of methyl isobutyrate). The reaction was cooled, and 1 g. of sodium added. Continuation of the refluxing produced no methanol. The pot temperature during this run was 130° C.

*Example II*

A mixture of 48.5 g. (0.26 mole) of methyl decanoate, 51.0 g. (0.25 mole) of dodecanethiol and 0.05 g. of lithium hydride was refluxed using a 10-in. packed column. The base heater temperature was 270° C. No methanol was distilled off, but the head temperature went to 230–240° C. and did not come down on prolonged refluxing. The reaction mixture was cooled and 1 g. of sodium was added. The refluxing was resumed, but no methanol was evolved.

*Example III*

A mixture of 101 g. (0.5 mole) of dodecanethiol, 72 g. (0.5 mole) of isobutyl isobutyrate and 1 g. of titanium butylate was refluxed under a 12-in. packed column. No isobutyl alcohol was separated on prolonged refluxing.

*Example IV*

A mixture of 41.0 g. (0.25 mole) of phenyl isobutyrate, 51.0 g. (0.25 mole) of dodecanethiol and 0.01 g. of lithium hydride was heated under a 6-in. Vigreux column with a simple still head attached. The initial base heater temperature was 230° C., but as phenol (boiling at 185° to 189° C.) was distilled out, the pot temperature rose to 285° C. Approximately the theoretical amount of phenol was obtained. The residue was distilled through a 10-in. packed column to give 51.7 g. (76%) of thiolisobutyric acid, dodecyl ester, B.P. 154–156° C. (2 mm.). The theoretical and actual values for percent carbon and hydrogen are as follows.

Calcd. for $C_{17}H_{32}OS$: C, 70.6; H, 11.8. Found: C, 70.5; H, 11.9.

*Example V*

A mixture of 51.0 g. (0.25 mole) of dodecanethiol, p-tolylisobutyrate, and 0.01 g. of lithium hydride was heated as described in Example IV. Approximately the theoretical amount of p-cresol was removed. The residue on distillation yielded 55.0 g. (81%) of thiolisobutyric acid, dodecyl ester.

*Example VI*

A mixture of 180 g. (0.5 mole) of phenyl stearate, 55 g. (0.5 mole) of thiophenol and 0.1 g. of titanium butylate was heated by a metal bath kept at 280° C., while phenol was separated at the head of a 24-in. packed column. Approximately the theoretical amount of phenol was obtained. The residue was a waxy solid and was almost pure thiolstearic acid, phenyl ester.

*Example VII*

A mixture of 174 g. (0.86 mole) of dodecanethiol, 146 g. (0.43 mole) of diphenylazelate and 0.03 g. of lithium hydride was heated under a 6-in. distillation column with a simple still head attached. The initial base heater temperature was 270° C., but as phenol was distilled out, the pot temperature rose to 305° C. The system was then put under vacuum and the remainder of the phenol was fractionated out. The residue was a light yellow solid melting about 40° C. This material was purified by distillation in a molecular still at about 1µ pressure to give 218.4 g. (91%) of dithiolazelaic acid, didodecyl ester. The theoretical and actual values for percent carbon and hydrogen are as follows.

Calcd. for $C_{33}H_{64}O_2S_2$: C, 71.3; H, 11.5. Found: C, 71.4; H, 11.3.

*Example VIII*

A mixture of 35.8 g. (0.1 mole) of diphenyl terephthalate, 33.2 g. (0.2 mole) of p-tert-butylthiophenol and 0.1 g. of calcium hydride was heated under a 10-in. packed column. Phenol was removed until the base heater reached 300° C. Then the system was put under vacuum to remove the remainder of the phenol. The cooled residue was a highly crystalline solid. Recrystallization from toluene gave 37.4 g. (84%) of dithiolterephthalic acid, bis(p-tert-butyl) phenyl ester having a melting point of 229–231° C. The theoretical and actual values for percent carbon and hydrogen are as follows.

Calcd. for $C_{28}H_{30}S_2O_2$: C, 72.8; H, 6.5; S, 13.8. Found: C, 72.6; H, 6.3; S, 13.8.

*Example IX*

A mixture of 84.8 g. (0.4 mole) of phenyl toluate, 34.0 g. (0.2 mole) of p-xylene-α,α′-dithiol and 0.01 g. of dibutyl tin oxide was refluxed under a 6-in. distillation column. Phenol was distilled off until the pot temperature rose to 310° C., and then the remaining low boilers were taken off under vacuum. The residue solidified on cooling and was recrystallized from toluene to give an 86% yield of p-xylene-α,α′-dithiol di-p-toluate.

*Example X*

A mixture of 29.8 g. (0.2 mole) of cyclohexanecarboxylic acid, p-nitrophenyl ester, 26.0 g. (0.1 mole) of p,p′-isopropylidene dithiophenol and 0.05 g. of lithium hydride was refluxed under a 6-in. distillation column, while p-nitrophenol was removed at the top of the column. When the base heater temperature reached 320° C., the system was evacuated to remove additional p-nitrophenol. The residue solidified on cooling and was recrystallized from xylene to give a 72% yield of 4,4′-isopropylidenedibenzenethiol, dicyclohexanecarboxylate.

*Example XI*

A mixture of 61.1 g. (0.5 mole) of 1,4-butanedithiol, 136 g. (1.0 mole) of phenyl acetate and 0.1 g. of lithium hydride was heated to 100° C. under a 10-in. packed column. Vacuum was applied, and the phenol that formed was removed by distillation. The residue was vacuum distilled to give 84.5 g. (82%) of 1,4-butanedithiol diacetate having a boiling point of 130–132° C. (20 mm.).

The following example shows the utility of the thiolesters as prepared in accordance with our invention as plasticizers.

*Example XII*

Fifty parts of poly(vinyl chloride) and 50 parts of dithiolazelaic acid, didodecyl ester prepared as in Example VII were compounded on heated rolls until a homogeneous material was obtained. The resulting plastic mass was rolled into thin sheets. The product was quite flexible, even at low temperatures. The plasticizer showed good resistance to leaching by hot, soapy water and also showed quite low volatility loss.

From the foregoing description it should be apparent that we have provided a novel method for the production of useful thiolesters.

Although the invention has been described in detail with reference to certain embodiments thereof, it will be understood that variations and modifications can be effected within the scope and spirit of the invention as described hereinabove and as defined by the appended claims.

We claim:

1. A process for preparing a thiolester comprising heating at a temperature up to about 320° C. in the presence of a basic ester interchange catalyst a phenyl ester of a carboxylic acid selected from the group consisting of those having the following formulas wherein R′ represents said phenyl in the form of phenyl radicals:

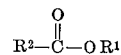

and

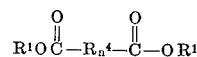

with a mercaptan selected from the group consisting of those having the following formulas:

and

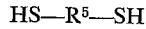

whereby said phenyl radicals from said phenyl ester and hydrogen atoms from the —SH radicals of said mercaptan react to form a phenol which is removed by vaporization during said heating at a temperature at least sufficient to produce said vaporization, said mercaptan having a boiling point higher than said phenol, said phenyl radicals ($R^1$) are selected from the group consisting of unsubstituted phenyl, chloro-substituted phenyl, methyl-substituted phenyl, and nitro-substituted phenyl radicals, $R^2$ is a monovalent radical selected from the group consisting of phenyl radicals, aliphatic radicals containing from 1 to 18 carbon atoms, cycloaliphatic radicals containing from 4 to 18 carbon atoms, said radicals having methyl-substituents and said radicals having nitro-substituents, $R^3$ is a monovalent radical selected from the group consisting of phenyl radicals, aliphatic radicals containing from 8 to 18 carbon atoms, said radicals having methyl-substituents and said radicals having nitro-substituents, $R^4$ is a divalent radical containing from 1 to 10 carbon atoms selected from the group consisting of o-phenylene, m-phenylene, p-phenylene, an aliphatic divalent radical, a cycloaliphatic radical, said radicals having methyl-substituents and said radicals having nitro-substituents, $R^5$ is a divalent radical selected from the group consisting of o-phenylene, m-phenylene, p-phenylene, an alkylidene diphenyl radical containing up to 18 carbon atoms, an aliphatic radical containing from 4 to 10 carbon atoms, said radicals having methyl-substituents and said radicals having nitro-substituents, $n$ is a cardinal number of from 0 to 1, said thiolester produced by this process having a formula wherein the symbols have been defined above which is selected from the gorup consisting of:

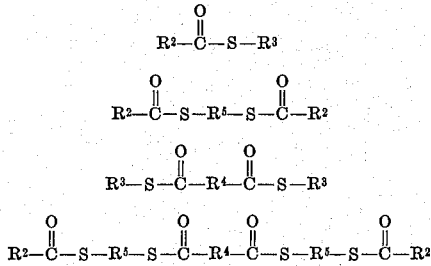

and

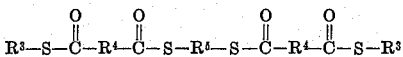

2. The process according to claim 1 wherein the reaction is conducted under less than atmospheric pressure.

3. A process according to claim 1 wherein the reaction pressure is about atmospheric and the reaction temperature is from about 190° C. to about 320° C.

4. The process according to claim 1 wherein the reaction is carried out under vacuum.

5. The process according to claim 1 wherein the reaction is started at atmospheric pressure and finished under vacuum.

6. The process according to claim 1 wherein the phenyl ester is phenyl isobutyrate and the mercaptan is dodecanethiol.

7. The process according to claim 1 wherein the phenyl ester is p-tolylisobutyrate and the mercaptan is dodecanethiol.

8. The process according to claim 1 wherein the phenyl ester is phenyl stearate and the mercaptan is thiophenol.

9. The process according to claim 1 wherein the phenyl ester is diphenylazalate and the mercaptan is dodecanethiol.

10. The process according to claim 1 wherein the phenyl ester is diphenyl terephthalate and the mercaptan is p-tert-butylthiophenol.

11. The process according to claim 1 wherein the phenyl ester is phenyl toluate and the mercaptan is p-xylene-$\alpha,\alpha'$-dithiol.

12. The process according to claim 1 wherein the phenyl ester is the p-nitrophenyl ester of cyclohexanecarboxylic acid and the mercaptan is p,p'-isopropylidene dithiophenol.

13. The process according to claim 1 wherein the phenyl ester is phenyl acetate and the mercaptan is 1,4-butanedithiol.

References Cited by the Examiner

UNITED STATES PATENTS

| | | | |
|---|---|---|---|
| 2,212,895 | 8/1940 | Allen | 260—455 |
| 2,854,467 | 9/1958 | Harman et al. | 260—455 |
| 2,855,375 | 10/1958 | Dobay | 260—30.8 |
| 2,863,899 | 12/1958 | Harris | 260—455 |
| 2,912,405 | 11/1959 | Cox | 260—30.8 |
| 3,012,049 | 12/1961 | Bill | 260—491 |

OTHER REFERENCES

Groggins: "Unit Processes in Organic Synthesis," 5th ed., pages 710 to 713 (1958).

Noller: "Chemistry of Organic Compounds," page 278 (1957).

Reid: "Organic Chemistry of Bivalent Sulfur," vol. IV, page 32 (1962).

Seifert: Jour. Prakt. Chem., vol. 139, N.F., 31 pages 462–478 (1885).

Wagner and Zook: "Synthetic Organic Chemistry," page 827 (1953).

CHARLES B. PARKER, *Primary Examiner*.

DANIEL ARNOLD, *Examiner*.

L. G. KASTRINER, S. H. LIEBERSTEIN, D. R. MAHANAND, *Assistant Examiners*.